Patented July 29, 1941

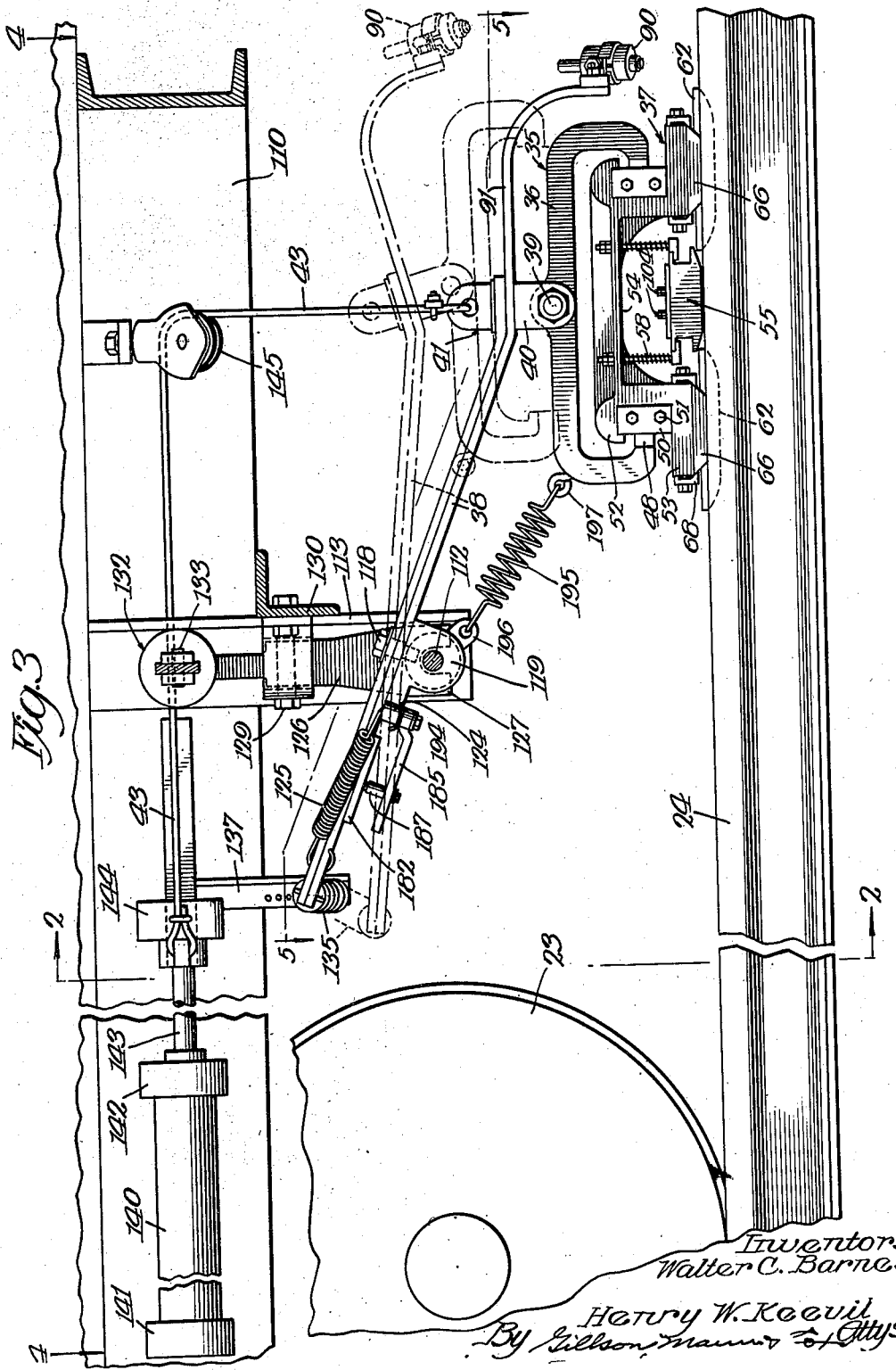

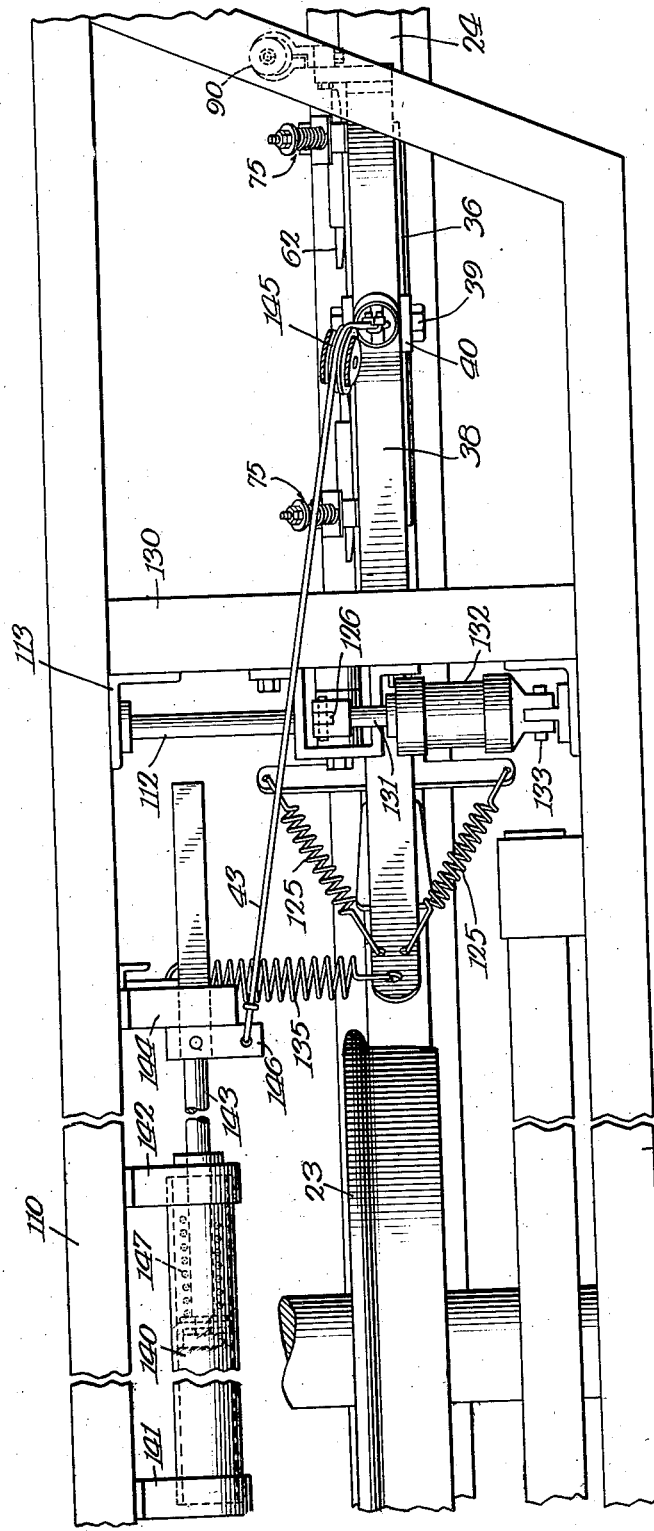

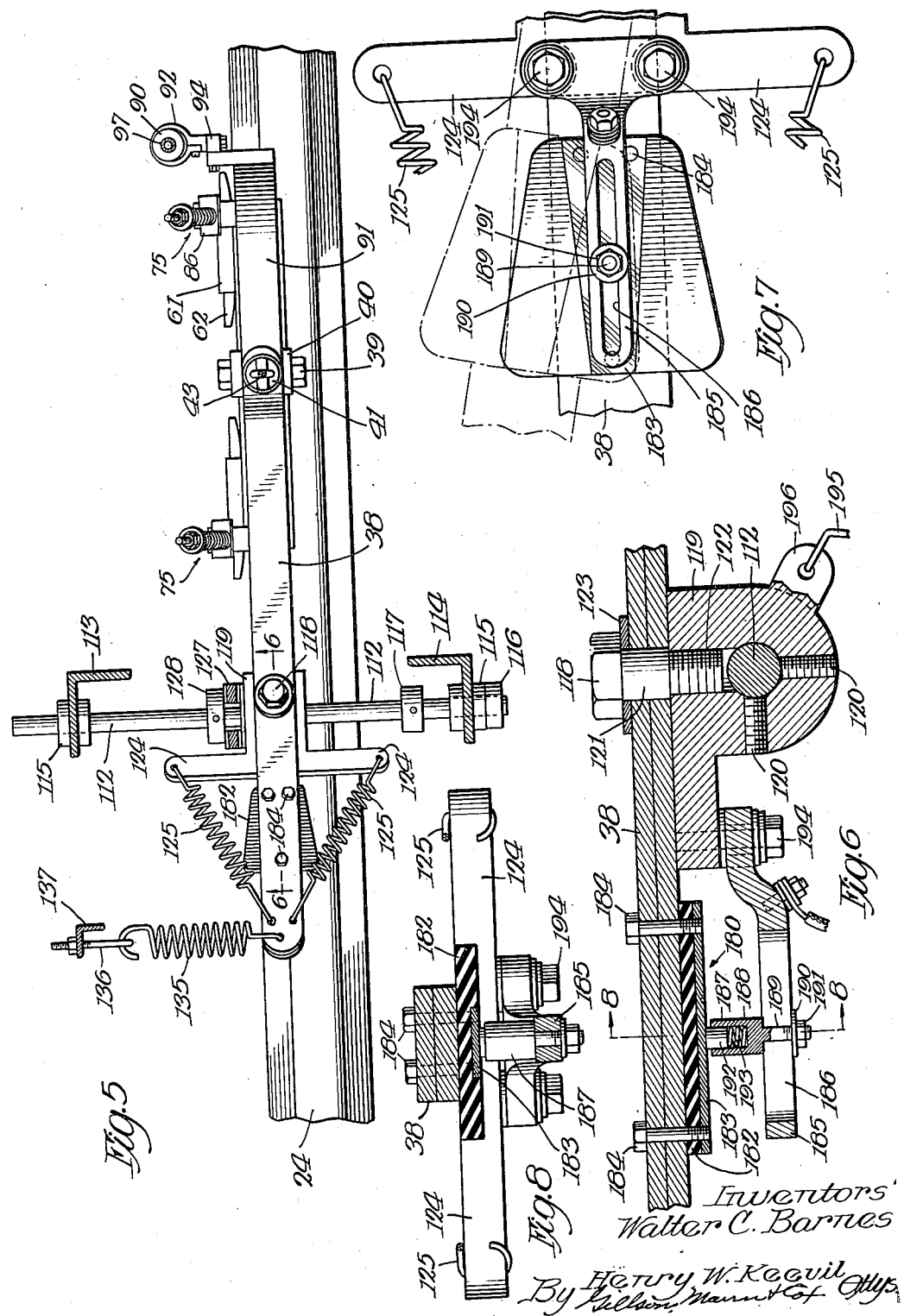

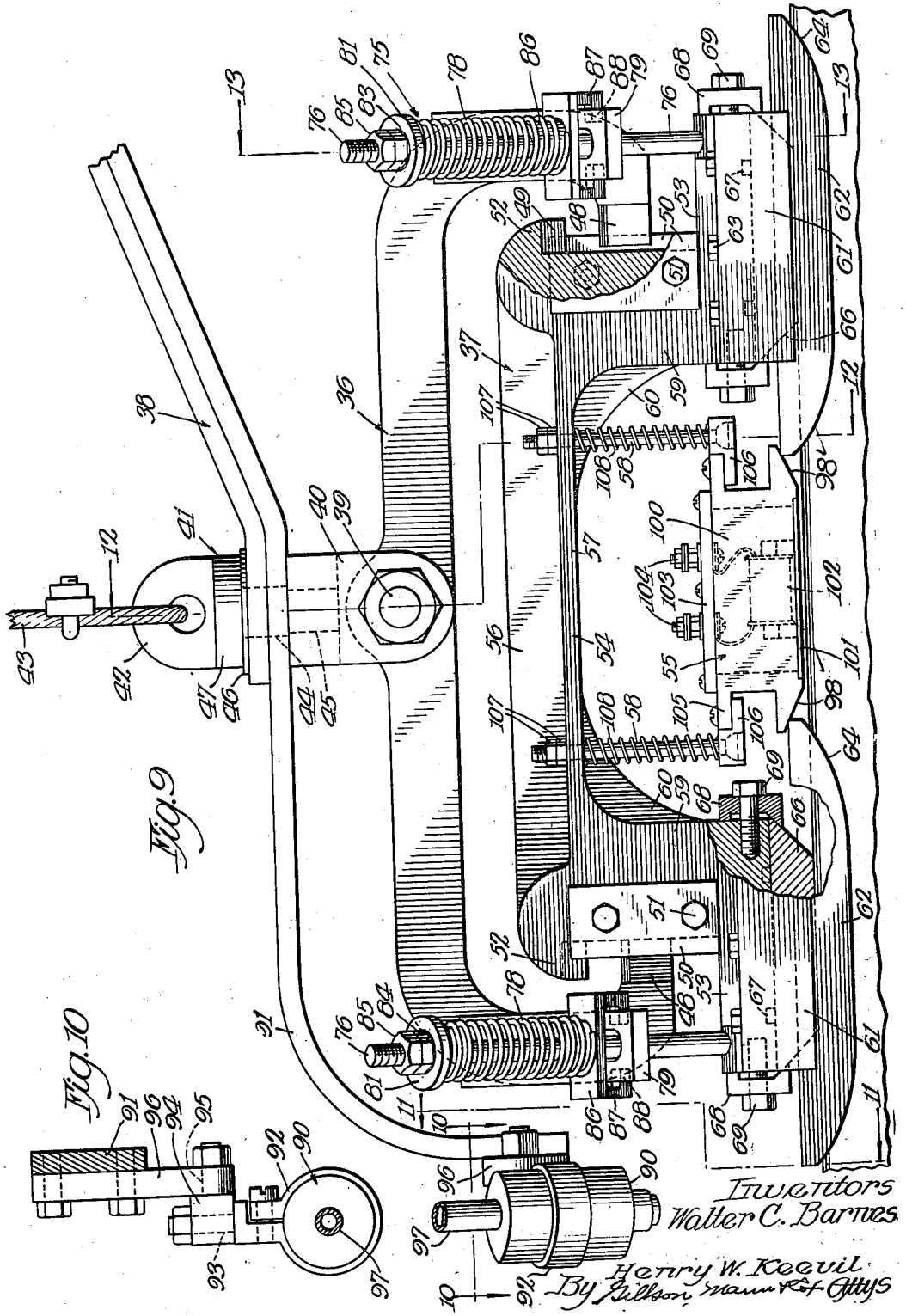

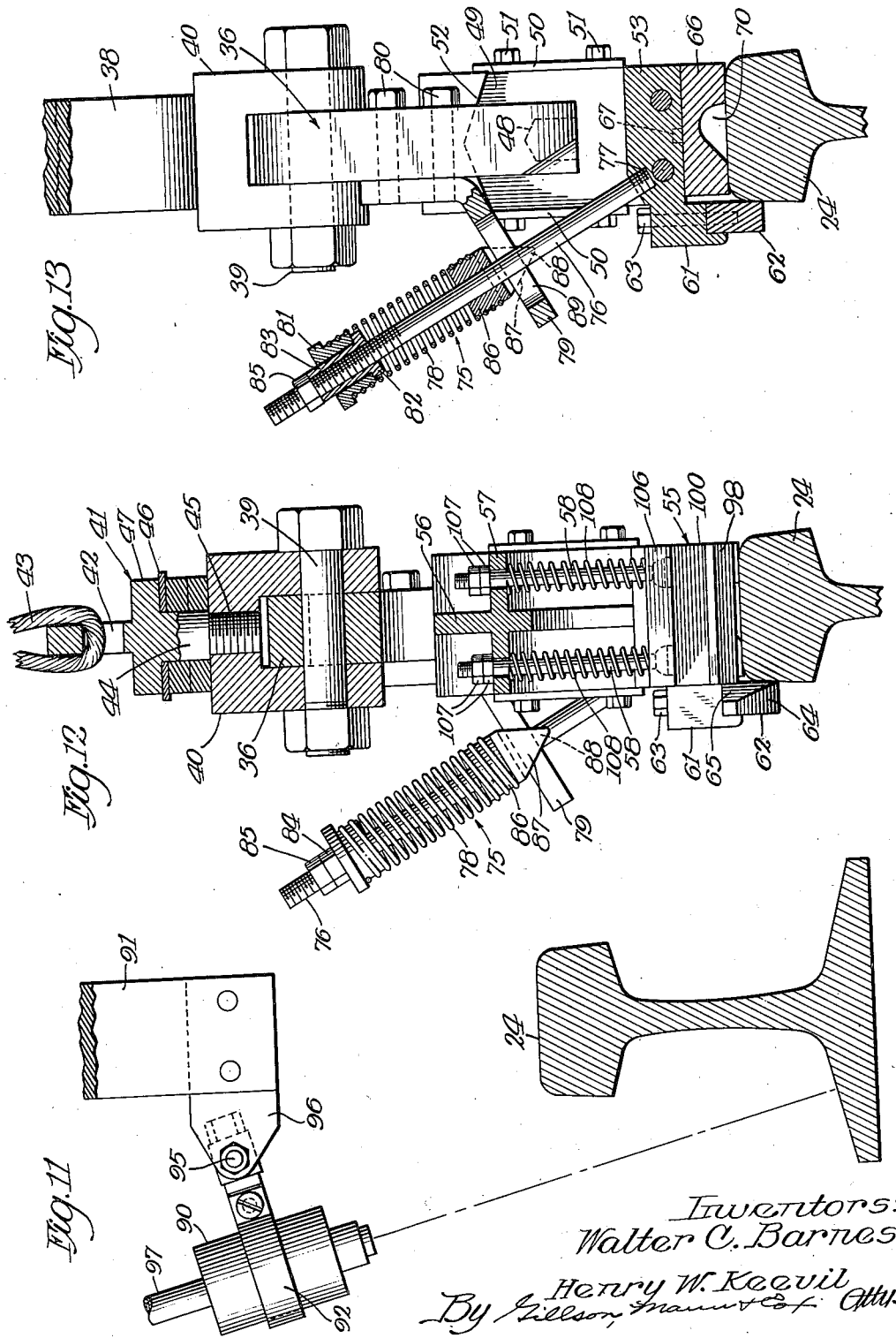

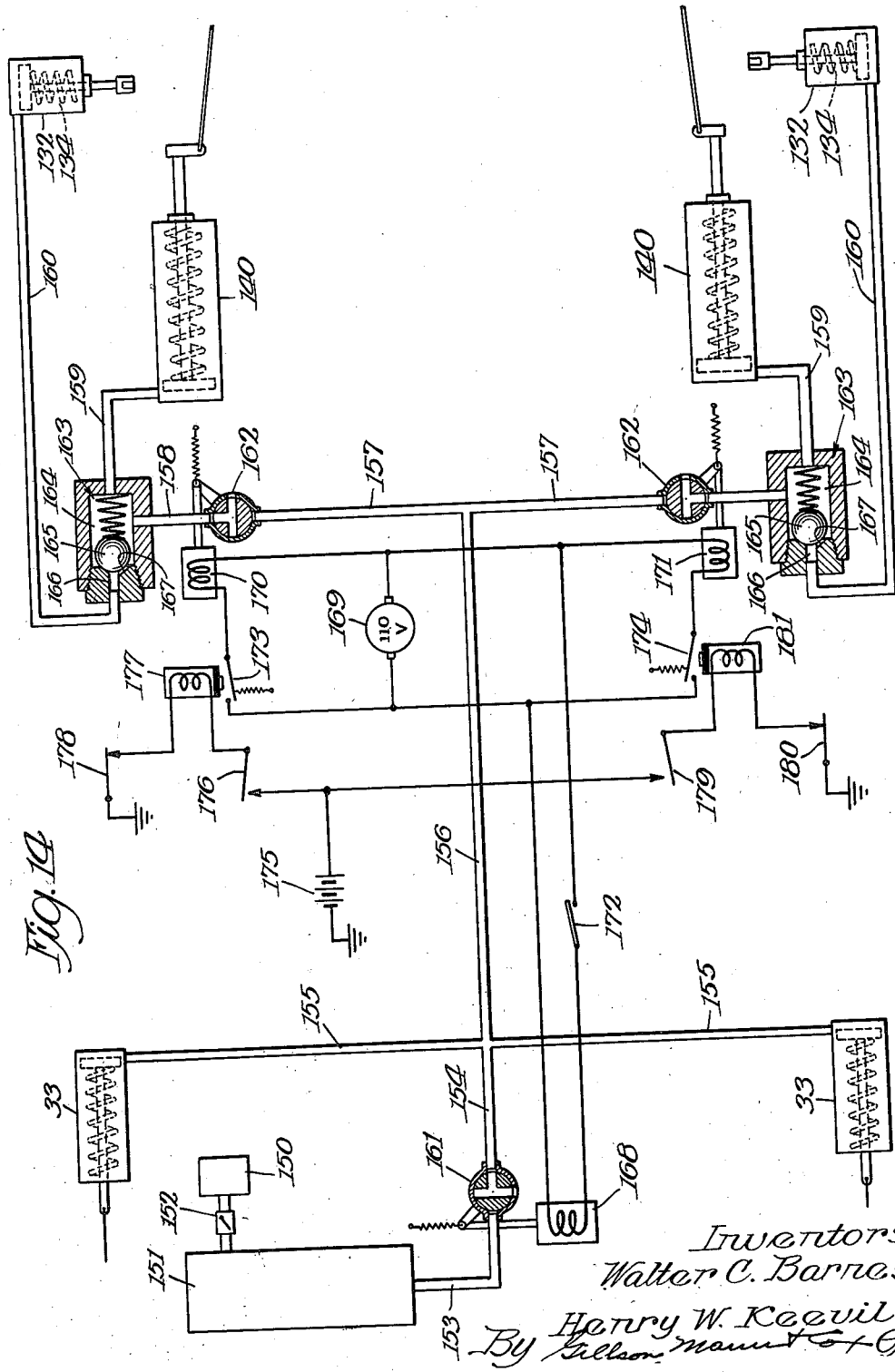

2,250,459

UNITED STATES PATENT OFFICE 2,250,459

FLAW DETECTING APPARATUS

Walter C. Barnes, Lake Bluff, and Henry W. Keevil, Highland Park, Ill.

Application November 27, 1937, Serial No. 176,850

28 Claims. (Cl. 175—183)

Recently a new and extremely successful method of testing rails for flaws has been devised which utilizes the phenomenon that fissures, when properly subjected to moving magnetic fields, can be polarized and then detected by suitable apparatus responsive to the magnetic conditions in the vicinity of the polarized flaws. The present invention relates particularly to the detecting apparatus used with this method, and its relationship to the rail energizing magnets, but it should be understood that the invention has applicability to other methods of flaw detection as well.

The detection of flaws is usually accomplished by mounting suitable equipment on a specially designed car, and then progressively testing the rails for flaws by slowly running the car along the track. The detecting apparatus, if designed to have physical contact with the rails, must be capable of certain movements, if it is to perform satisfactorily.

Although the magnetic method of testing does not absolutely require that the detecting apparatus be mounted in physical contact with the rail, such an arrangement is preferable, provided the carriage is capable of making the necessary movements and has certain other attributes. For one thing, the carriage must be capable of being lifted from the rail so that when the car is not doing test work, it will not be in a position to interfere with fast running of the car. Means also must be provided for making certain that the carriage will strike the rail and move to proper position when the carriage is lowered. Furthermore, the carriage must be designed to follow the varying contours of the rail as well as the rail alinement, and preferably, the carriage should be designed so that it will ride through frogs without derailment.

The attainment of these and other advantages (such as the automatic lifting of the carriage in case of derailment, and the ability of the carriage to support a paint gun without affecting the balance of the carriage) constitute the principal objects of this invention, as will be better understood by the description which follows and reference to the drawings, in which Fig. 1 is a side, elevational view of a flaw detector car equipped with the detector carriage of this invention;

Fig. 3 is a vertical, sectional view taken on the line 3—3 of Fig. 2 and looking toward the center of the car;

Fig. 4 is a horizontal, sectional view taken on the line 4—4 of Fig. 3;

Fig. 5 is a horizontal, sectional view taken on the line 5—5 of Fig. 3;

Fig. 6 is a fragmentary, sectional view taken on the line 6—6 of Fig. 5, showing particularly the switch arrangement for automatically lifting the detector carriage when it is derailed;

Fig. 7 is a fragmentary bottom plan view of the switch itself;

Fig. 8 is a sectional view taken on the line 8—8 of Fig. 6, and further illustrates the construction of the switch;

Fig. 9 is an enlarged side elevational view (with some parts broken away) of the detector carriage and its support from the trailing arm;

Fig. 10 is a vertical, sectional view taken on the line 10—10 of Fig. 9, looking down on the paint gun;

Fig 11 is a vertical, sectional view taken on the line 11—11 of Fig. 9, looking at the paint gun in side elevation;

Figs. 12 and 13 are vertical and sectional views respectively, taken on the lines 12—12 and 13—13 of Fig. 9;

Fig. 14 is a schematic diagram of the electrical control system for the magnet and the detector carriages;

Fig. 15 is a side elevational view showing a modified form of guide runner; and

Fig. 16 is a plan view of the same.

The drawings accompanying this specification and the specific description which follows, disclose a preferred embodiment of the invention as required by Sec. 4888 of the Revised Statutes, but the invention is not limited to the embodiment chosen for illustration, and the appended claims should be construed as broadly as the prior art will permit.

FLAW DETECTION METHOD IN GENERAL

Although the detector carriage of this invention is capable of use with the so-called electro-inductive method of testing in which an induction coil moving along the rail detects variations in the magnetic field around the rail set up by a strong direct current which is passed longitudinally through the rail, the invention will be described as applied to the newly devised magnetic system of testing because of its greater accuracy, practicability and lessened cost, and the probability that it will eventually supplant the electro-inductive system.

Broadly speaking, the method consists in progressively sending a magnetic flux through limited portions of the rail and then, after the energizing force has moved ahead, progressively exploring the portion of the rail which has been energized with detection apparatus capable of responding to the residual magnetism in the vicinity of flaws. The detecting apparatus preferably includes an induction coil which is connected to a suitable amplifying and recording apparatus for observation by the engineer in charge of tests. Tests have shown that this method of flaw detection is extremely reliable and has the decided advantage of being able to test certain kinds of rail which, because of false indications, cannot practically be tested by the electro-inductive method of flaw detection.

THE CAR

Figure 1:
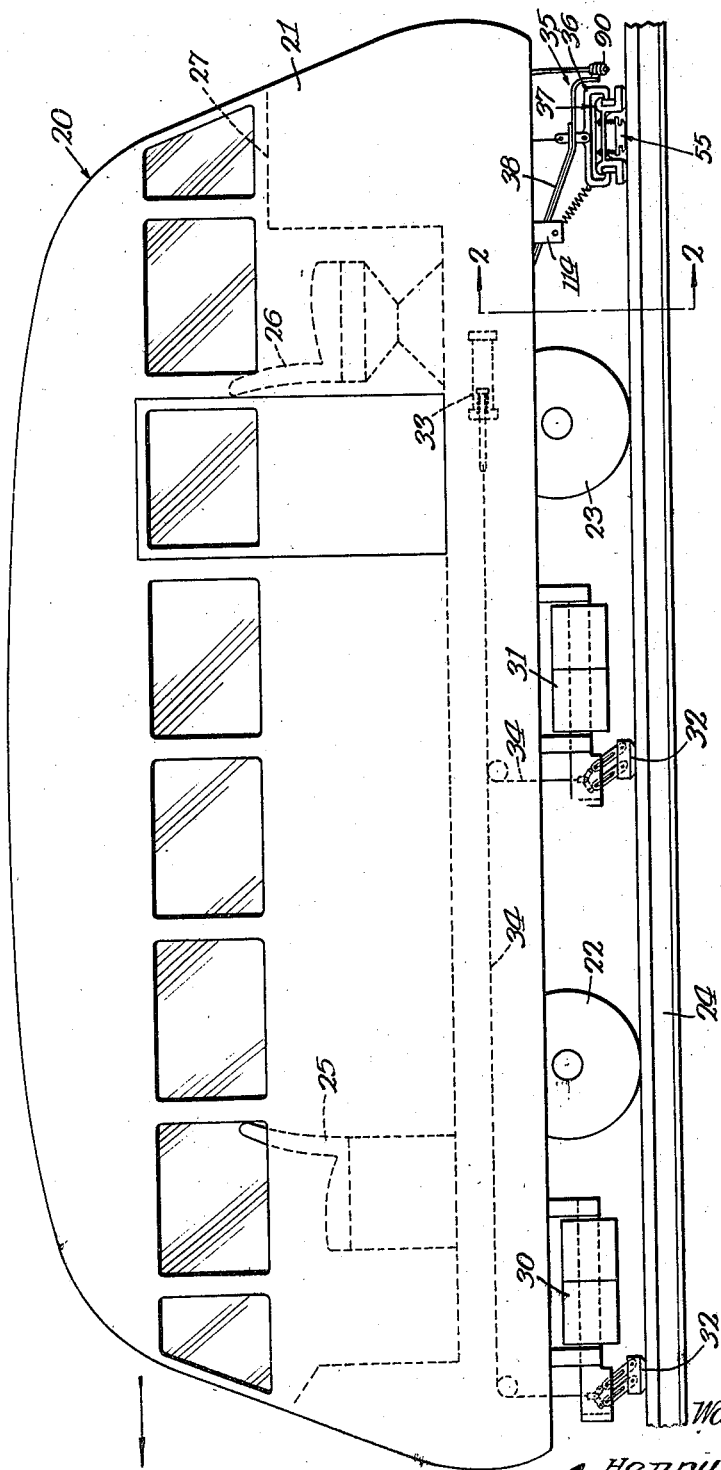

The detector car, generally designated 20, which is used for carrying the flaw detection equipment and for making the tests, comprises a body 21 mounted on wheels 22 and 23 adapted to run on rails 24. The direction of movement of the car is indicated by the arrow in Fig. 1, a seat 25 being provided at the front of the car for the driver, and a seat 26 being provided at the rear of the car for the engineer in charge of tests so that he can see the record which is being made on the record board 27 and at the same time observe the track itself through the rear window of the car.

THE CAR EQUIPMENT

The car is equipped with an electro-magnet 30 mounted in front of the wheel 22 and a second electro-magnet 31 mounted between the wheels 22 and 23, it being understood that duplicate equipment is mounted on the other side of the car. The magnets are provided with retractible contact shoes 32 which are raised from and lowered to the rail by the action of an air cylinder, generally designated 33, acting through cables 34. The car carries suitable generators and air compressors for energizing the magnets 30 and 31 and operating the air cylinder 33.

A detector, generally designated 35, is mounted behind the rear wheel 23 and it consists of an upper carriage 36 and a lower carriage 37, both of which are mounted on an arm 38 supported beneath the car underframe.

THE DETECTOR CARRIAGE
(See Figs. 3, 9, 12 and 13, particularly)

The upper top carriage 36 consists of a bronze casting in the form of a yoke, the central portion being loosely pivoted by a bolt 39 to a clevis 40 which is supported beneath the arm 38 by a steel lift bolt 41 having an eye 42 adapted to receive the lift cable 43 and a shank 44 which passes through the arm 38 and terminates in a reduced threaded portion 45 to which the clevis 40 is secured. A steel washer 46 is preferably interposed between the head 47 of the lift bolt and the top surface of the arm 38.

Obviously the connection between the upper carriage 36 and the arm 38 permits the former to have a rocking movement about the bolt 39 and a swinging movement about the lift pin 41, both of which movements are of considerable importance if the carriage as a whole is to properly follow the rail surface.

The ends of the yoke 36 are turned inwardly to form thrust lugs 48 which lie within pockets 49 at the ends of the lower carriage 37. The pockets are defined at their sides by removable plates 50 held in place by cap screws 51, and up and down movement of the thrust lug 48 in the pocket is limited at the top by an inverted V-shaped projection 52 and at the bottom by the foot 53 of the lower carriage. The thrust lug 48 has its top surface beveled to mate with the inverted V-shaped projection 52 so that when the arm 38 is lifted, the lug 48 and projection 52 act as a centering device to align the lower carriage 37 with the top carriage 36.

The lower carriage 37 likewise comprises a bronze casting somewhat in the form of a yoke, the intermediate portion being raised as at 54 to accommodate the pickup box or search unit, generally designated 55. The casting at the intermediate portion 54 consists of a vertical web 56 and a horizontal web 57, the latter projecting on opposite sides of the vertical web 56 to form flanges through which bolts 58 pass in supporting the pickup unit 55 from the lower carriage.

The yoke 37 has enlarged legs 59 which merge with the intermediate portion 54 and are strengthened by integral gussets 60. The pockets 49 are formed on the outer end faces of the legs 59 as best shown in Figs. 9 and 13. The feet 53 which are integrally joined with the legs 59 have lateral extensions 61 to which hard rolled phosphor bronze guide runners 62 are secured by bolts 63. The guide runners at their ends are curved upwardly as indicated at 64 and tapered away from the gauge edge of the rail, as indicated at 65 (Fig. 12) so that they are inherently capable of following the gauge edge of the rail without being fouled by scaly edges, etc.

Attached to the feet 53 are replaceable shoes 66 made of cast stainless steel, manganese steel, or other wear resistant and non-magnetic material. The shoes are kept in proper alinement with the feet by pins 67, and clamps 68 held in place by bolts 69 secure the shoes to the feet. Preferably the shoes 66 have a longitudinal groove 70 to make the carriage more stable on the rail.

Both the shoes 66 and guide runners 62 may be easily replaceable when worn.

When the arm 38 which supports the entire detector carriage is lifted, the upper carriage 36 picks up the lower carriage 37 and centers it, this function being accomplished by the lugs 48 seating in the apex of the inverted V-shaped projection 52. When the arm 38 is lowered to bring the detector carriage in contact with the rail, the lower carriage frees itself from the upper carriage by lowering of the lugs 48 with respect to the projection 52, and the only connection between the upper and lower carriages (except for the thrust of the rear lug 48) is by means of duplicate resilient units generally designated 75, one at each end of the rod.

Each of the units 75 comprises a rod 76 having its lower end threaded into the foot 53 as indicated at 77, and having its upper end adjustably attached to a tension spring 78, the lower end of which is slidably anchored to a slotted bracket 79 secured by bolts 80 to the ends of the upper carriage 36.

The upper end of the spring 78 may be adjustably secured to the rod 76 in any suitable manner, as for example by exteriorly threading the end of the spring on a grooved collar 81 which is telescoped over and seats upon the lower flange 82 of an adjusting collar 83, the upper or exposed end of which is faceted as indicated at 84 to receive a wrench. A lock nut 85 fixes the adjustment of the resilient unit when the desired tension of the spring 78 has once been obtained.

The lower end of the spring 78 is exteriorly threaded on a yoke 86 which axially receives the rod 76 and has legs 87 straddling the bracket 79 and engaging its undersurface with lugs 88 integral with the legs 87.

Obviously when the carriage as a whole is resting on the rail (see Fig. 13), the weight of the arm 38 and the upper carriage 36 exert a downward force on the lower end of the springs 78 which force is transmitted through the rod 76 to the lower carriage to hold the latter firmly on the rail.

When the lower carriage 37 rocks about an axis parallel to the rail, the lugs 88 ride along the bracket 79 as the rod 76 moves in the slot 89 of the bracket and, if desired, anti-friction rollers (not shown) may be mounted on the lugs 88 to facilitate this movement.

PAINT GUN MOUNTING

To assist the engineer in charge of tests in locating the exact spot in the rail which has caused an indication to come through on the recording apparatus, it is customary to provide a paint gun operated by the detecting apparatus for shooting a small dab of paint on the rail at the place where the magnetic conditions of the rail caused the record apparatus to be actuated. The gun should be placed slightly in rear of the pickup itself, the distance being determined by the speed at which the car moves and the type of rail painting apparatus which is used. When a high speed paint gun arrangement is used, the gun may be located approximately nine inches in rear of the pickup unit, and in such a case, the gun, here generally designated 90, may be supported on an extension 91 of the arm 38. Preferably the gun is mounted for universal adjustment so that the gun may be aimed at the exact spot where a flaw occurs, taking into consideration the normal speed of the car and the time which is consumed for the paint dab to reach the rail. A convenient way to universally mount the gun is by means of a clamp 92 which has a stud 93 rotatably mounted in an eye 94 having a shank 95 rotatably supported in a bracket 96 attached to the extension 91 of the arm 38.

The paint gun is connected to a suitable source of supply in part indicated at 97.

PICKUP UNIT AND ITS MOUNTING

The pickup unit 55, best shown in Figs. 9 and 12, comprises a box 100 preferably of brass or bronze, having a soldered-in bottom 101 upon which the induction test coil 102 rests. The ends of the box are slightly beveled, as indicated at 98 to assist the unit in riding over obstructions and the top of the box is closed by a removable cover 103 upon which the terminals 104 are mounted.

The box has flanges 105 which are adapted to rest upon and be adjustably secured to support plates 106, the connection being made by a conventional pin and slot device, or its equivalent, so that the box may be adjustably positioned transversely of the rail. The support plates are suspended from the bolts 58 which pass through the flanges 57 of the lower carriage 37 and are adjusted for length by nuts 107. Springs 108 aid in keeping the support plates in the lowest position which the adjustment of the nuts 107 permits.

THE MOUNTING FOR THE DETECTOR CARRIAGE

The mounting for the detector carriage accomplishes several functions: It enables the carriage to be moved to and from the rail; it exerts a lateral force to make the carriage follow the rail; it may exert a downward force on the carriage to assist gravity in keeping the carriage on the rail; it moves the carriage onto the rail in such a way that the carriage will always strike the rail even though the car is standing on a curve; it steadies the carriage on the rail; and it permits the carriage to be deflected laterally in case of derailment without causing damage to either the detector carriage or its mounting. Other functions will be apparent as the disclosure proceeds.

At each side of the car underframe are two longitudinally extending sills 110 and 111, both of channel form and having their webs back to back. A rotatable shaft 112 is supported from the sills 110 and 111 by angles 113 and 114, the shaft being mounted in suitable bearings, as indicated at 115. The shaft is capable of lengthwise movement in the bearings, and adjustably positioned collars 116 and 117 limit the throw of the shaft.

The arm 38 which carries the detector 35 is conveniently made of two or more superimposed leaves of stainless steel (non-magnetic) bars riveted or otherwise secured together to serve as a supporting arm for the carriage. An intermediate portion of the arm is secured by a bolt 118 to a pivot block 119 which is telescoped over the shaft 112 and held against relative movement by set screws 120. The bolt 118 has a shank 121 which passes through the arm 38 and terminates in a reduced threaded portion 122 which is screwed into the pivot block 118, as best shown in Fig. 6. A steel washer 123 is preferably used between the head of the bolt 118 and the arm 38 so that the arm has free swinging movement around the pivot bolt 118. Since the shaft 112 permits the arm 38 to rock about the axis of the shaft, it is apparent that the arm is capable of movement about both a vertical and a horizontal axis.

The pivot block 119 is provided with integral wings 124 to the ends of which are attached stabilizing springs 125 having their opposite ends connected to the upper end of the arm 38. The springs are of equal tension so that normally they hold the arm 38 in a position at right angles to the shaft 112, and it is primarily for this purpose that they are employed.

OPERATING MECHANISM FOR THE DETECTOR CARRIAGE INCLUDING CONTROLS

Detector push-over mechanism

The entire detector carriage assembly can be moved laterally by means of an operating device which includes a lever 126 having its lower end bifurcated, as at 127, to straddle the shaft 112 between the pivot block 119 and a collar 128. The lever is fulcrumed as at 129 to a cross member 130 rigidly attached to the sills 110 and 111, and the upper end of the lever is connected to the push rod 131 of an air cylinder 132. The air cylinder is pivotally connected as at 133 to the sill 111 to permit the push rod 131 to operate without binding as the upper end of the lever moves in an arc. As will be apparent from an inspection of Fig. 2, the application of air to the cylinder 132 moves the shaft 112 and the mechanism which it carries to the right, and when the air is released from the cylinder, the shaft is returned to its normal position by the action of the return spring 134 in the cylinder 132.

Figure 2:
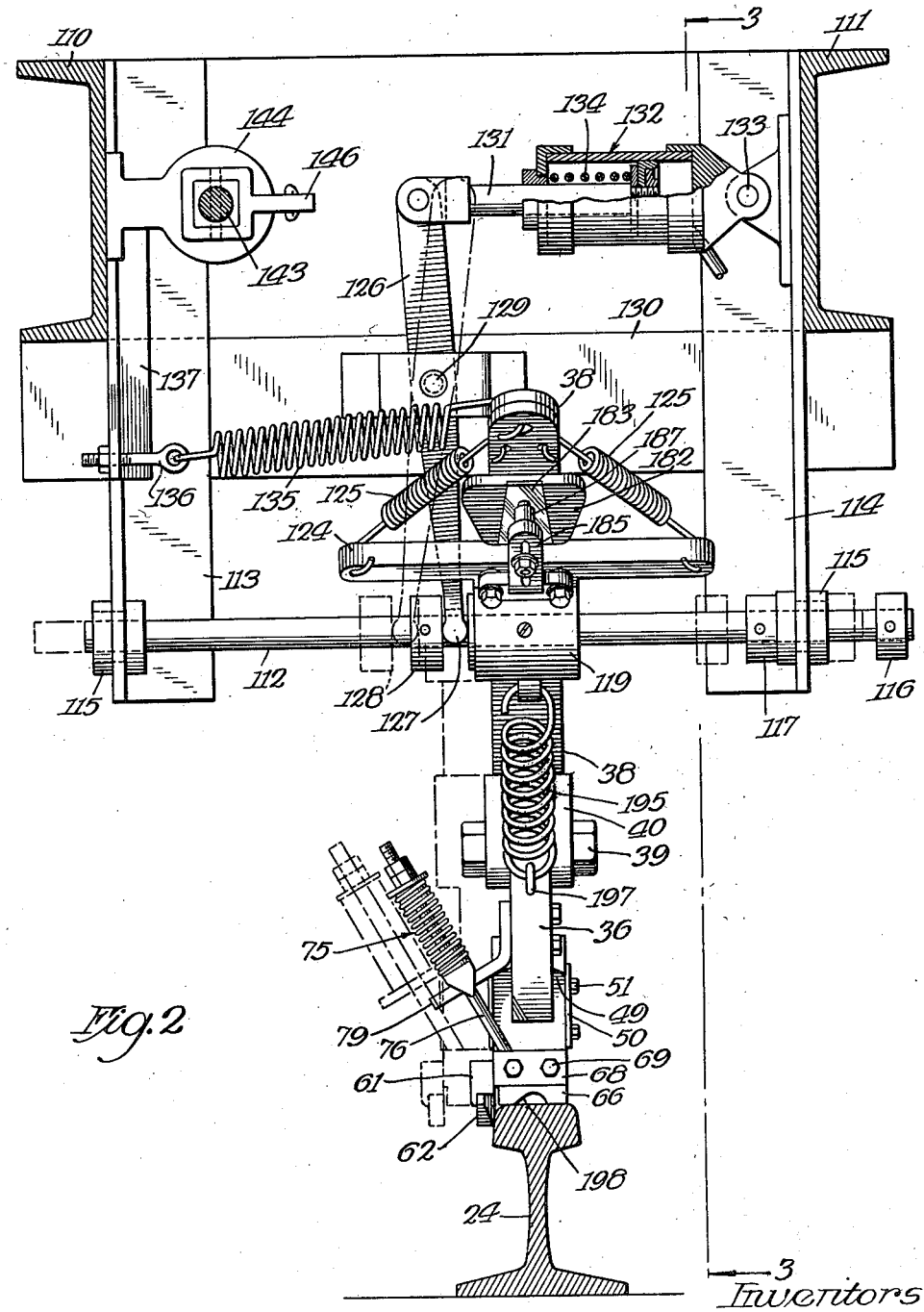
Fig. 2 is a vertical, sectional view taken on the line 2—2 of Fig. 3 and looking rearwardly toward the detector carriage.

When the detector carriage is shifted into its operative position on the rail by the action of the push over mechanism operating through the lever 126, a spring 135 extending between the upper end of the arm 38 and an eye 136, adjustably positioned on a bracket 137, is placed under tension (the spring is adjusted so that it is not under tension when the shaft 112 is in its inoperative position, i. e. to the left in Fig. 2). The spring 135 when tensioned applies a lateral force to the detector carriage 35, the arm 38 acting as a lever with its fulcrum at 118. If the eyebolt 136 is placed higher on the bracket 137, it can exert a downward force on the detector carriage in addition to its lateral force by reason of the arm 38 acting as a lever with its fulcrum at the shaft 112.

*Lift mechanism for the detector carriage*

The detector carriage is raised and lowered by means of an air cylinder 140 attached to the sill 110 by brackets 141 and 142, the push rod 143 for the cylinder preferably operating in an outboard bearing 144. The lift cable 43 is attached to the eye 42 of the lift bolt 41, passes over a pulley 145, and is attached at its other end to a cable clamp 146. The carriage is lowered by applying air to the cylinder 140, and a return spring 147 lifts the carriage when air is released from the cylinder 140.

*The control system*

The control system is best illustrated in the diagram of Fig. 14, and it combines electrical with pneumatic control.

An air compressor 150 maintains the air in an air reservoir 151 under a predetermined pressure, a check valve 152 being interposed in the connection between the pump and the air reservoir as usual. The reservoir communicates with the air cylinders 33 controlling the magnet shoes through pipes 153, 154 and 155. The air reservoir communicates with the detector carriage lift cylinders 140 through pipes 153, 154, 156, 157, 158 and 159, and the air reservoir communicates with the push-over cylinders 132, through pipes 153, 154, 156, 157, 158 and 160. Electro-magnetically operated valves 161 and 162 are interposed between the pipes 153 and 154, and 157 and 158, respectively, and a three-way time delay valve 163 is interposed between the pipes 158, 159 and 160 on each side of the car.

Considering the operation of the apparatus on one side of the car only, and assuming that the cylinders 33, 132 and 140 are in the position in which they are shown in Fig. 14, and that the valves 161 and 162 have just been turned to place the adjacent pipes in communication, the air pressure in the pipe line will immediately cause the push rods in the cylinders 33 and 140 to move outwardly thus lowering the magnet shoes and the detector carriage substantially instantaneously. The air under pressure in the three-way time delay valve 163, (which for the purpose of this disclosure, may be considered as comprising an air chamber 164, and a spring pressed ball valve 165 seating in an air passage 166 having a restricted air passage 167 when the ball is seated) slowly leaks through the passage 167 into the pipe 160, and after an interval of a few seconds (depending upon the size of the restricted passageway 167) the air pressure in the pipe 160 becomes sufficient to overcome the pressure of the spring 134 and thus operate the push-over mechanism. The push-over mechanism, however, is not operated until the detector carriage has completed its downward movement with a portion of the carriage resting on the gauge side of the rail.

When one of the valves 162 is turned through 90° so as to place the pipe 158 in communication with the atmosphere, the return springs in the cylinders 134 and 140 immediately act to move the push rods inwardly, the ball 165 is in the time delay valve 163 moving away from its seat against the pressure of the spring to allow both the cylinders 132 and 140 to act substantially simultaneously. Since there is a valve 162 associated with the detecting apparatus on each side of the car, either apparatus may be lifted from the rail, or lowered to operative position independently of the other.

The operating solenoid 168 for the three-way air valve 161 is connected across a generator 169 and the operating solenoids 170 and 171 which control the valves 162 are also connected across the generator 169 in parallel with each other and with the solenoid 168. The solenoid 168 for the main air valve 161 is controlled by a hand switch 172 and the circuits for the solenoids 170 and 171 are controlled by time delay electro-magnetic switches 173 and 174, respectively, which are adapted to immediately open the associated circuits upon de-energization of the relay coils and delay the closing of the associated circuits for a period of four or five seconds after the relay coils have been again energized.

A battery 175 grounded on one side is connected in series with a hand switch 176, the operating coil 177 for the electro-magnetic switch 173 and a safety switch 178, and thence to ground. The battery 175 is similarly connected to a hand switch 179 and a safety switch 180 which control the operation of the detecting apparatus on the other side of the car, the switches 179 and 180 being connected in series with each other and with the operating coil 181 of the relay 174.

The safety switches 178 and 180 are identical, and the latter is shown in its physical structure in Figs. 5, 6, 7 and 8. The switch comprises an insulating plate 182 in which is embedded a contact strip 183 of copper or other conducting material. The plate 182 with its insert 183 is secured by bolts 184 to the underside of the arm 38 just above the wings 124 of the pivot block 119. Rigidly attached to the pivot block 119 is a contact arm 185 which is slotted, as indicated at 186, to adjustably receive a contact member 187 which comprises a recessed block 188 having a downwardly extending shank 189 which passes through the slot 186 of the contact arm and receives a washer 190 and nut 191 on its lower end, the upper end of the block 188 being fitted with a contact button 192 which is resiliently urged against the contact plate 183 by a spring 193. The contact arm 185 is attached to the pivot block 119 by bolts 194 so that it is in alinement with the arm 38 and hence the contact button 192 will be in engagement with the longitudinally extending metal plate 183 as long as the arm 38 is substantially at right angles to the shaft 112.

As shown in the electrical diagram in Fig. 14, one side of the safety switch 178 is connected in series with the operating coil 181 of the relay 174 and the hand switch 179, while the other side is connected to ground. Hence, whenever the arm 38 rotates about the pin 118 through more than a predetermined angle (the angle is determined by the positioning of the contact member 187 within the slot 186 which in turn is determined by the normal swinging movement of the arm 38 when rounding curves and following slight variations in rail alinement) as in the case when the detector carriage goes off on a switch, or is otherwise derailed, the contact button 192 moves off the contact plate 183 onto the insulating plate 182 and the circuit through the operating coil 181 (Fig. 14) is broken, with the result that the switch 174 is opened, the coil 171 de-energized, and the valve 162 is turned by the action of the return spring associated with the valve to the position in which it is shown in Fig. 14, in which the air cylinders 140 and 132 are connected to atmosphere. The opening of the valve 162 to atmosphere lifts the detector carriage immediately and a centering spring 195 (Fig. 3) extending between a lug 196 on the pivot block 119 and an eye 197 on the upper carriage immediately aligns the carriage 35 with the arm 38 which in turn is quickly brought to parallelism with the rail by the action of the stabilizing springs 126. As soon as this is done, the switch 178 is automatically closed again causing the switch 174 to also close and thereby again operate the valve 162 to place the pipe 157 in communication with the cylinders 132 and 140 to lower the carriage on the rail.

Again referring to Fig. 14, it will be seen that closing the hand switches 176 and 179 associated with the two detector carriages on opposite sides of the car can have no effect on lowering the carriages unless the switch 172 which operates the valve 191 has been closed to put the magnet shoes down and supply air to the feed pipes 156 and 157. Similarly when the switch 172 is opened, all of the air cylinders including the cylinders 33, 132 and 140 are open to atmosphere to that all of the magnet shoes and both detector carriages are lifted. When the magnet shoes are down, either one of the detector carriages may be raised or lowered without affecting the other, but the magnet shoes cannot be raised without also raising the detector carriage. The advantage of this arrangement is that the detecting apparatus cannot be operated without the magnet shoes being in position to magnetize the rail, but when the magnet shoes are in operative position, the detector carriages can be individually and independently raised and lowered as occasion demands. This is a very desirable relationship.

SUMMARY OF OPERATION (A) *Lowering the detector carriage*

Assuming that it is desired to lower the detector carriage operating on the left rail, the following takes place upon closing the switch 179: The electro-magnetic switch 174 is closed; the valve 162 is turned through 90° from the position in which it is shown in Fig. 14; air flows from the air reservoir 151 to the time delay valve 164 which immediately applies air to the cylinder 140; the push rod 143 (Fig. 4) moves out to lower the carriage to the position shown in full lines in Fig. 2, the spring 135 during this movement being kept free of tension; and the air pressure in the cylinder 132 then builds up sufficiently to operate the lever 126 (Fig. 2) to move the detector to the position shown in full lines in Fig. 2, the inclined surface 198 of the slot 70 in the shoe 66 facilitating the carriage moving into its operative position, and the spring 135 being placed in tension during the lateral movement of the entire detector carriage assembly.

(B) *The ability of the carriage to follow the rail*

The lower carriage 37 which carries the search unit 55 is constrained to follow the contour and alinement of the rail under all conditions by reason of the following features: The resilient units 75 apply a downward and outward force on the feet 53 of the lower carriage 37 on a line which intersects the rail and in such a manner that there is no tendency for the carriage to leave the rail; the guide runners 62 position the search unit accurately on the rail head and by their shape, length and spacing contribute to the ability of the carriage to ride through face-point frogs, switches, crossovers, and the like, (the single elongated runner 71 shown in Figs. 15 and 16 accomplishes this function to an even greater extent); the pivot bolt 39 permits the carriage to swing about a horizontal axis so that it can ride up and down over high and low spots; the pivot pin 41 permits the carriage to rotate about a vertical axis so that the carriage can follow all variations in rail alinement and adjust itself to the proper angle with respect to the arm 38 as the arm moves with the car laterally with respect to the rail; the arm 38 can rotate on the pivot pin 118 so that not only can the arm change its angle as the car sways from side to side, but also so that the detector carriage may swing through a relatively wide angle in case it is accidentally derailed; the horizontal shaft 112 permits the arm 38 to move up and down as the distance between the car underframe and the rail is changed because of slight bouncing of the car and it also permits the carriage to rise from the rail in case of derailment, or when the carriage is intentionally lifted; the spring 135 resiliently holds the lower end of the arm 38 in the proper position for the resilient units 75 to exert their downward and outward pressure on the lower carriage; the steadying springs 125 help to steady the arm 38 in its normal position; and the spring 195 serves to aline the detector carriage when the arm 38 is lifted.

(C) *Lifting the carriage*

When it is desired to lift the carriage, the following takes place upon opening the switch 179: The switch 174 is de-energized; the valve 162 is moved to the position in which it is shown in Fig. 14; the air rushes from the cylinder 140 allowing the spring 147 to move the push rod 143 to the left (Fig. 4) thereby lifting the carriage at the same time that air is escaping from the cylinder 132 and through the ball valve 165 which allows the spring 134 to move the lever 126 to the position in which it is shown in dotted lines in Fig. 2; and the spring 195 aligns the carriage 35 with the rail for the next time that it is to be lowered to the rail.

(D) *Automatic lift of the carriage*

In the event that the arm 38 swings through more than a predetermined angle, as for example, when it follows the wrong rail at a switch or a frog, the following takes place: The switch 180 is opened, thereby causing the carriage to be lifted in the same manner in which it is lifted by opening of the switch 179; as soon as the arm 38 swings back to its normal position parallel with the rail, which is accomplished by the action of the springs 125, the switch 180 is automatically closed, allowing the carriage to be lowered in its normal manner as previously described.

We claim:

1. In apparatus for detecting flaws in rail, a car, an arm extending rearwardly from the car and having its trailing end capable of relatively free lateral movement, a detector carriage mounted on said end by means permitting the carriage to rock on a horizontal axis transverse to the rail, and means for exerting a lateral force on said trailing end of the arm.

2. In apparatus for detecting flaws in rails, a car, flaw detecting apparatus mounted on the car, said apparatus including a carriage adapted to ride on the rail, a supporting arm for the carriage, means for swinging the arm about a horizontal pivot to lift the carriage and about a substantially vertical axis to enable the carriage to follow the rail alinement, and a resilient connection between the arm and the carriage.

3. In apparatus for detecting flaws in rails, a car, flaw detecting apparatus mounted on the car, said apparatus including a carriage adapted to ride on the rail, a supporting arm for the carriage, means for swinging the arm about a horizontal pivot to lift the carriage and about a substantially vertical axis to enable the carriage to follow the rail alinement, and resilient means tending to hold the arm in a position at right angles to the horizontal pivot when the carriage is being lowered.

4. In apparatus for detecting flaws in rails, a car, flaw detecting apparatus mounted on the car, said apparatus including a carriage adapted to ride on the rail, a supporting arm for the carriage, means for swinging the arm about a horizontal pivot to lift the carriage and about a substantially vertical axis to enable the carriage to follow the rail alinement, and resilient means tending to rotate the arm about the vertical axis to hold the carriage in lateral engagement with the rail when the carriage is in operative position.

5. In apparatus for detecting flaws in rails, a car, flaw detecting apparatus mounted on the car, said apparatus including a carriage adapted to ride on the rail, a supporting arm for the carriage, means for swinging the arm about a horizontal pivot to lift the carriage and about a substantially vertical axis to enable the carriage to follow the rail alinement, and a paint gun carried at the lower end of the arm.

6. In apparatus for detecting flaws in rail, a car, a detector carriage, means for mounting the carriage on the car including a pivotal support which permits the carriage to turn about a vertical axis, means for raising and lowering the carriage, and means for alining the carriage with the rail when the carriage has been raised.

7. In apparatus for detecting flaws in rail, a car, a detector carriage, means for mounting the detector carriage on the car whereby it may be raised from and lowered to the rail, said carriage comprising an upper carriage, a lower carriage, resilient means joining the upper and lower carriages, means loosely holding said upper and lower carriages in assembled relation so that when the lower carriage is in operative position, it is free to ride upon the rail without lateral restraint other than that afforded by the resilient means, and self-centering means for alining the lower carriage with the upper carriage when the carriage as a whole is lifted from the rail.

8. In apparatus for detecting flaws in rails, a car, a detector carriage mounted on the car, means for raising and lowering the carriage, and automatic means for lifting the carriage whenever the carriage moves laterally beyond a predetermined point.

9. In apparatus for detecting flaws in rails, a car, a detector carriage mounted on the car, means for raising and lowering the carriage, automatic means for lifting the carriage whenever the carriage moves laterally beyond a predetermined point, and means for automatically lowering the carriage after it has again alined itself with the rail.

10. In apparatus for detecting flaws in rails, a car, a detector carriage having a gauge runner, means including a lift cylinder for raising and lowering the carriage, a push-over device including a second cylinder for displacing the carriage laterally, and time delay means for operating said push-over device sequentially with the first means mentioned.

11. In apparatus for detecting flaws in rails, a car, a detector carriage having a gauge runner, means including a lift cylinder for raising and lowering the carriage, and a push-over device including a second cylinder for displacing the carriage laterally, each of said cylinders having a push rod, means for supplying air to said cylinder, and means for causing the cylinder of the push-over device to operate its push rod subsequently to the operation of the push rod associated with the lift cylinder.

12. In apparatus for detecting flaws in rail, a car, a detector carriage adapted to ride on the rail, means for raising and lowering the carriage relative to said rail, means for supporting the carriage for lateral movement on the rail about a substantially vertical axis, displacing means for bodily moving the last named means outwardly toward the gauge side of the rail, and resilient biasing means tensioned by said bodily movement for accelerating outward movement of the carriage so that contact with the rail by the carriage is made before the displacing means has reached its outer limit, the resilient means operating to hold the detector carriage against the gauge edge of the rail under pressure after the displacing means has reached its outer limit of movement.

13. In apparatus for detecting flaws in rails, a magnetizing device, a detector carriage, means for raising and lowering the magnetizing device with respect to the rail, and means for raising and lowering the detector carriage with respect to the rail, said last named means being operative only when the magnetizing device is lowered or being lowered, but not otherwise.

14. In apparatus for detecting flaws in rails, a car, flaw detecting apparatus mounted on the car, said apparatus including a carriage adapted to ride on the rail, a supporting arm for the carriage, means for swinging the arm about a horizontal pivot to lift the carriage and about a substantialy vertical axis to enable the carriage to follow the rail alinement, and a yoke extending lengthwise to and straddling the carriage and pivoted to the end of the arm, the yoke engaging the carriage so as to transmit a pushing force to move the carriage along the rail, the carriage having vertical movement relative to the yoke.

15. In apparatus for detecting flaws in rails, a car, flaw detecting apparatus mounted on the car, said apparatus including a carriage adapted to ride on the rail, a supporting arm for the carriage, a horizontal shaft extending transversely to the car, means for mounting the arm on the shaft at a point intermediate its ends whereby the arm is adapted to pivot vertically about the horizontal shaft, pivot horizontally about a vertical axis, and is movable laterally along the axis of the shaft, means cooperating with the arm for raising and lowering the carriage from the rail, means cooperating with the arm for moving the carriage laterally, and means for maintaining the arm normally at substantially right angles to the shaft.

16. In apparatus for detecting flaws in rails, a car, flaw detecting apparatus mounted on the car including a carriage adapted to ride on the rail, an arm, a shaft mounted underneath the car and extending transversely thereto, means for supporting the arm intermediate its ends on the shaft so that the arm will pivot vertically about the shaft and horizontally about a vertical axis, means for supporting the carriage on one end of the arm including a yoke engaging the carriage to move the carriage longitudinally along the rail, said last named means providing vertical movement of the carriage with respect to the arm, and means providing rotary motion of the carriage with respect to the arm about a vertical axis.

17. In apparatus for detecting flaws in rails, a car, flaw detecting apparatus mounted on the car, said apparatus including a carriage adapted to ride on the rail, a supporting arm on the car, means for securing the carriage to the supporting arm to provide rocking movement of the carriage about longitudinal and transverse axes and rotary movement of the carriage about a vertical axis, said securing means comprising a yoke straddling the carriage longitudinally thereof, a lug on one leg of the yoke projecting inwardly to a point adjacent to the carriage, and a vertical guide pocket on the carriage.

18. In apparatus for detecting flaws in rails, a car, flaw detecting apparatus mounted on the car, said apparatus including a carriage adapted to ride on the rail, a supporting arm on the car, means for securing the carriage to the supporting arm to provide rocking movement of the carriage about longitudinal and transverse axes and rotary movement of the carriage about a vertical axis, said securing means comprising a yoke straddling the carriage longitudinally thereof, a lug on one leg of the yoke projecting inwardly to a point adjacent to the carriage, a centering slot on the end of the carriage spaced above the lug on the yoke, and a complementary centering member on the yoke cooperating with the slot when the carriage is lifted off the rail to aline the carriage in parallel relationship with the longitudinal axis of the yoke.

19. In apparatus for detecting flaws in rails, a car, flaw detecting apparatus mounted on the car including a carriage adapted to ride on the rail, means for supporting the carriage on the car in such a manner that it can ride on the rail and move laterally with respect to the car, electrically operating means for raising the carriage off the rail, an electrical circuit controlling said last named means, a circuit breaker in the electrical circuit being normally closed when the carriage is positioned within a predetermined area laterally of the car but being adapted to open the electrical circuit when the carriage moves laterally beyond this predetermined area, the electrically operated raising means being adapted to raise the carriage from the rail in response to the opening of the circuit breaker.

20. In apparatus for detecting flaws in rails, a car, flaw detecting apparatus mounted on the car including a carriage adapted to ride on the rail, means for supporting the carriage on the car in such a manner that it can ride on the rail and move laterally with respect to the car, means for raising the carriage off the rail, control means for normally operating the raising means, and automatic control means operating the raising means to lift the carriage off the rail in the event the carriage moves laterally more than a predetermined amount.

21. In apparatus for detecting flaws in rails, a car, flaw detecting apparatus mounted on the car including a carriage adapted to ride on the rail, means for supporting the carriage on the car for movement along the rail and movement laterally with respect to the car, electrically operated means for raising the carriage off the rail, an electrical circuit controlling said last named means including a circuit breaker comprising a contact plate and a contact button movable over the plate, the button being normally in contact with the plate when the carriage is positioned within a predetermined area laterally of the car but being adapted to move off the plate to break the electrical circuit when the carriage moves laterally beyond this predetermined area, means responsive to the breaking of the circuit to raise the carriage off the rail, means to automatically center the carriage with respect to the car after it has been raised off the rail, and time delay means to close the circuit through the circuit breaker to again lower the carriage onto the rail after it has been centered.

22. In apparatus for detecting flaws in rails, a car, flaw detecting apparatus mounted on the car, said apparatus including a carriage adapted to ride on the rail, a supporting arm for the carriage, a horizontal shaft on the car, means for mounting the arm at a point intermediate its ends on the shaft so that the arm may pivot vertically about the shaft and horizontally about a vertical axis, the carriage being pivotally secured to one end of the arm, and stabilizing springs applying equal and opposite forces to the arm to hold the arm in a position at right angles to the shaft.

23. In apparatus for detecting flaws in rails, a car, flaw detecting apparatus mounted on the car, said apparatus including a carriage adapted to ride on the rail, a support for the carriage, means for swinging the support about a horizontal pivot to lift the carriage and about a substantially vertical axis to enable the carriage to follow the rail alinement, means tending to rotate the support about the vertical axis to hold the carriage in lateral engagement with the rail when the carriage is in operative position, and resilient means for applying a downward and outward force to the carriage, said resilient means including a rod on one side of and inclined with respect to the carriage, a bracket on the carriage support yieldingly urged toward the carriage, and a spring interposed between the rod and the bracket urging the rod downwardly and outwardly, the relative positions of the rod and the support pivot being such that the line of force through the rod passes to one side of the pivot point.

24. In apparatus for detecting flaws in rails, a car, a detector carriage having a gauge runner, means including a lift cylinder for raising and lowering the carriage, a push-over device including a second cylinder for displacing the carriage laterally, each of said cylinders having a push rod, means for supplying air to said cylinders, a valve controlling the flow of air to the lifting clylinder, a second valve on the discharge side of the first valve operating in response to the first valve for controlling the flow of air to the displacing cylinder, time delay means cooperating with the second valve to control the flow of air into the displacing cylinder to delay the operation of said cylinder for a predetermined time interval after the first valve has opened, and means for operating the first valve.

25. In apparatus for detecting flaws in rails, a car, a detector carriage having a gauge runner, means including a lift cylinder for raising and lowering the carriage, a push-over device including a second cylinder for displacing the carriage laterally, each of said cylinders having a push rod, means for supplying air to said cylinders, a valve controlling the flow of air to the lifting cylinder, a second valve controlling the flow of air to the displacing cylinder, means controlling the operation of both valves, and time delay means cooperating with the second valve to control the flow of air into the displacing cylinder to delay the operation of the displacing cylinder for a predetermined time interval after the first valve has been opened.

26. In apparatus for detecting flaws in rails, a car, a detector carriage having a gauge runner, means including a lift cylinder for raising and lowering the carriage, a push-over device including a second cylinder for displacing the carriage laterally, each of said cylinders having a push rod, means for supplying air to said cylinder, a magnetically operated valve controlling the flow of air to the lifting cylinder, an electric circuit operating the magnetic valve including a circuit breaker, a second valve for controlling the flow of air to the displacing cylinder, time delay means cooperating with the second valve to control the flow of air into the displacing cylinder to delay the operation of said cylinder for a predetermined time interval after the first valve has been opened in response to the closing of the circuit breaker.

27. Apparatus for detecting flaws in rail, a car, a detector carriage, means for mounting the detector carriage on the car whereby it may be raised from and lowered to the rail, said carriage comprising an upper carriage, a lower carriage, inclined resilient means joining the upper and lower carriages, means loosely holding said upper and lower carriages in assembled relation so that when the lower carriage is in operative position it is free to ride upon the rail without lateral restraint other than that afforded by the resilient means, and means for applying a downward and lateral force to the lower carriage through the resilient means along a line intersecting the railhead.

28. In a detector carriage of the class described, an upper carriage, a lower carriage, a connection between the two carriages comprising an elongated member secured to one carriage in an inclined position and movably engaging the other carriage, and a resilient member supported by the elongated member whereby relative movement between the upper and lower carriages is cushioned by said resilient member.

WALTER C. BARNES.
HENRY W. KEEVIL.